US010780588B2

(12) United States Patent
Smith et al.

(10) Patent No.: US 10,780,588 B2
(45) Date of Patent: Sep. 22, 2020

(54) END EFFECTOR FOR A ROBOTIC ARM

(71) Applicant: Sarcos LC, Salt Lake City, UT (US)

(72) Inventors: Fraser M. Smith, Salt Lake City, UT (US); Michael Morrison, West Jordan, UT (US); Glenn Colvin, Jr., Park City, UT (US); Wayco Scroggin, Sandy, UT (US)

(73) Assignee: Sarcos LC, Salt Lake City, UT (US)

( * ) Notice: Subject to any disclaimer, the term of this patent is extended or adjusted under 35 U.S.C. 154(b) by 264 days.

(21) Appl. No.: 15/484,929

(22) Filed: Apr. 11, 2017

(65) Prior Publication Data

US 2017/0217023 A1  Aug. 3, 2017

Related U.S. Application Data

(62) Division of application No. 13/841,006, filed on Mar. 15, 2013, now Pat. No. 9,616,580.

(Continued)

(51) Int. Cl.
*B25J 15/00* (2006.01)
*B25J 15/04* (2006.01)
*B25J 15/10* (2006.01)

(52) U.S. Cl.
CPC ....... *B25J 15/0066* (2013.01); *B25J 15/0475* (2013.01); *B25J 15/10* (2013.01); *Y10S 901/39* (2013.01)

(58) Field of Classification Search
CPC ... B25J 3/04; B25J 9/0084; B25J 9/009; B25J 15/00; B25J 15/0009; B25J 15/0028; B25J 15/0033; B25J 15/0042; B25J 15/0066; B25J 15/02; B25J 15/0206; B25J 15/08; B25J 15/10; G05B 2219/37117;

(Continued)

(56) References Cited

U.S. PATENT DOCUMENTS 1,880,138 A    9/1932  Franz
2,850,189 A    9/1958  Leroy (Continued)

FOREIGN PATENT DOCUMENTS

CN    101214653 A    7/2008
CN    103610524 A    3/2014

(Continued)

OTHER PUBLICATIONS

Aliens (Movie), Starring Sigourney Weaver, Directed by James Cameron, Written by James Cameron, David Giler, Walter Hill, Dan O'Bannon, Ronald Shuset, Released 1985 by Twentieth Century Fox, Scenes at Playtime 88:26:31-00:26:59 & 00:27:40-00:28:05 & 02:08:25-02:10:39 Non-Patent Literature documentation; Aliens(1986)—IMDb; downloaded Sep. 27, 2014; 4 pages; http://www.imdb.com/title/tt10090605/

(Continued)

*Primary Examiner* — Saul Rodriguez
*Assistant Examiner* — Brendan P Tighe

(57) ABSTRACT

An end effector for a robotic arm is disclosed. The end effector includes a grasping apparatus having a gripping member and an appendage extending from the gripping member forming a channel between the griping member and the appendage. The channel is configured to receive at least a portion of an article, such as a latch for a container, to be manipulated by the end effector.

6 Claims, 5 Drawing Sheets

Related U.S. Application Data

(60) Provisional application No. 61/646,743, filed on May 14, 2012.

(58) Field of Classification Search
CPC ........... G05B 2219/37281; G05B 2219/37304; G05B 2219/37558; G05B 2219/37571; Y10S 901/39
USPC ....... 414/680, 729, 730, 732, 736, 738, 739, 414/753.1; 700/259; 901/9, 31, 39, 47
See application file for complete search history.

(56) References Cited

U.S. PATENT DOCUMENTS

| | | |
|---|---|---|
| 2,981,198 A | 4/1961 | Nettel |
| 3,171,549 A | 3/1965 | Orloff |
| 3,280,991 A | 10/1966 | Melton et al. |
| 3,306,646 A | 2/1967 | Flora, Jr. |
| 3,358,678 A | 12/1967 | Kulstar |
| 3,449,008 A | 6/1969 | Colechia |
| 3,449,769 A | 6/1969 | Mizen |
| 3,535,711 A | 10/1970 | Fick |
| 3,759,563 A | 9/1973 | Kitamura |
| 4,046,262 A | 9/1977 | Vykukal et al. |
| 4,179,233 A | 12/1979 | Bromell et al. |
| 4,200,596 A | 4/1980 | Iiyama et al. |
| 4,251,791 A | 2/1981 | Yanagisawa et al. |
| 4,398,110 A | 8/1983 | Flinchbaugh et al. |
| 4,483,407 A | 11/1984 | Iwamoto et al. |
| 4,567,417 A | 1/1986 | Francois et al. |
| 4,575,297 A | 3/1986 | Richter |
| 4,591,944 A | 5/1986 | Gravel |
| 4,603,896 A | 8/1986 | Vasseur et al. |
| 4,661,032 A | 4/1987 | Arai |
| 4,666,357 A | 5/1987 | Babbi |
| 4,723,353 A * | 2/1988 | Monforte ............. B25J 15/0052 414/737 |
| 4,762,455 A | 8/1988 | Coughlan et al. |
| 4,768,143 A | 8/1988 | Lane et al. |
| 4,821,594 A | 4/1989 | Rosheim et al. |
| 4,834,443 A | 5/1989 | Crowder et al. |
| 4,853,874 A | 8/1989 | Iwamoto et al. |
| 4,883,400 A | 11/1989 | Kuban et al. |
| 4,884,720 A | 12/1989 | Whigham et al. |
| 4,915,437 A | 4/1990 | Cherry |
| 4,921,292 A | 5/1990 | Harwell et al. |
| 4,997,095 A | 3/1991 | Jones et al. |
| 5,004,391 A | 4/1991 | Burdea |
| 5,038,089 A | 8/1991 | Szakaly |
| 5,072,361 A | 12/1991 | Davis et al. |
| 5,080,682 A | 1/1992 | Schectman |
| 5,101,472 A | 3/1992 | Repperger |
| 5,105,367 A | 4/1992 | Tsuchihashi et al. |
| 5,117,814 A | 6/1992 | Luttrell et al. |
| 5,144,943 A | 9/1992 | Luttrell et al. |
| 5,172,951 A | 12/1992 | Jacobsen et al. |
| 5,230,147 A | 7/1993 | Asaoka et al. |
| 5,239,246 A | 8/1993 | Kim |
| 5,246,216 A | 9/1993 | Oberst |
| 5,280,981 A | 1/1994 | Schulz |
| 5,282,460 A | 2/1994 | Boldt |
| 5,328,224 A | 7/1994 | Jacobsen et al. |
| 5,336,982 A | 8/1994 | Backes |
| 5,389,849 A | 2/1995 | Asano et al. |
| 5,399,951 A | 3/1995 | Lavallee et al. |
| 5,516,249 A | 5/1996 | Brimhall |
| 5,577,417 A | 11/1996 | Fournier |
| 5,577,902 A | 11/1996 | Todo et al. |
| 5,588,688 A | 12/1996 | Jacobsen et al. |
| 5,664,636 A | 9/1997 | Ikuma et al. |
| 5,704,945 A | 1/1998 | Wagner et al. |
| 5,762,390 A | 6/1998 | Gosselin et al. |
| 5,784,542 A | 7/1998 | Ohm et al. |
| 5,785,505 A | 7/1998 | Price |
| 5,797,615 A | 8/1998 | Murray |
| 5,845,540 A | 12/1998 | Rosheim |
| 5,865,770 A | 2/1999 | Schectman |
| 5,898,599 A | 4/1999 | Massie et al. |
| 5,912,658 A | 6/1999 | Bergamasco et al. |
| 5,949,686 A | 9/1999 | Yoshinada et al. |
| 5,957,981 A | 9/1999 | Gramnas |
| 5,961,476 A | 10/1999 | Betto et al. |
| 5,967,580 A | 10/1999 | Rosheim |
| 5,994,864 A | 11/1999 | Inoue et al. |
| 6,016,385 A | 1/2000 | Yee et al. |
| 6,170,162 B1 | 1/2001 | Jacobsen et al. |
| 6,202,013 B1 | 3/2001 | Anderson et al. |
| 6,272,924 B1 | 8/2001 | Jansen |
| 6,301,526 B1 | 10/2001 | Kim et al. |
| 6,338,605 B1 | 1/2002 | Halverson et al. |
| 6,340,065 B1 | 1/2002 | Harris |
| 6,360,166 B1 | 3/2002 | Alster |
| 6,394,731 B1 | 5/2002 | Konosu et al. |
| 6,425,865 B1 | 7/2002 | Salcudean et al. |
| 6,430,473 B1 | 8/2002 | Lee et al. |
| 6,435,794 B1 | 8/2002 | Springer |
| 6,507,163 B1 | 1/2003 | Allen |
| 6,508,058 B1 | 1/2003 | Seaverson |
| 6,554,342 B1 | 4/2003 | Burnett |
| 6,641,371 B2 | 11/2003 | Graziani et al. |
| 6,659,703 B1 | 12/2003 | Kirkley |
| 6,659,939 B2 | 12/2003 | Moll et al. |
| 6,663,154 B2 | 12/2003 | Pancheri |
| 6,714,839 B2 | 3/2004 | Salisbury, Jr. et al. |
| 6,740,125 B2 | 5/2004 | Mosler |
| 6,855,170 B2 | 2/2005 | Gramnas |
| 7,168,748 B2 | 1/2007 | Townsend et al. |
| 7,369,057 B2 | 7/2008 | Ye et al. |
| 7,396,057 B2 | 7/2008 | Ye et al. |
| 7,405,531 B2 | 7/2008 | Khatib et al. |
| 7,409,882 B2 | 8/2008 | Massimo et al. |
| 7,410,338 B2 | 8/2008 | Schiele et al. |
| 7,509,905 B2 | 3/2009 | Jacobsen et al. |
| 7,628,766 B1 | 12/2009 | Kazerooni et al. |
| 7,783,384 B2 | 8/2010 | Kraft |
| 7,862,522 B1 | 1/2011 | Barclay et al. |
| 7,862,524 B2 | 1/2011 | Carignan et al. |
| 7,883,546 B2 | 2/2011 | Kazerooni et al. |
| 7,947,004 B2 | 5/2011 | Kazerooni et al. |
| 7,965,006 B2 | 6/2011 | Kang et al. |
| 8,024,071 B2 | 9/2011 | Komatsu et al. |
| 8,051,764 B2 | 11/2011 | Jacobsen et al. |
| 8,100,451 B2 | 1/2012 | Okuda et al. |
| 8,132,835 B2 | 3/2012 | Ban et al. |
| 8,151,401 B2 | 4/2012 | Cheyne |
| 8,182,010 B2 | 5/2012 | Lee et al. |
| 8,245,728 B2 | 8/2012 | Jacobsen et al. |
| 8,295,975 B2 | 10/2012 | Arimatsu et al. |
| 8,375,982 B2 | 2/2013 | Gray, Jr. |
| 8,435,309 B2 | 5/2013 | Gilbert et al. |
| 8,452,447 B2 | 5/2013 | Nixon |
| 8,473,101 B2 | 6/2013 | Summer |
| 8,511,192 B2 | 8/2013 | Bird et al. |
| 8,516,918 B2 | 8/2013 | Jacobsen et al. |
| 8,529,582 B2 | 9/2013 | Devengenzo et al. |
| 8,560,118 B2 | 10/2013 | Greer et al. |
| 8,640,723 B2 | 2/2014 | Jacobsen et al. |
| 8,667,643 B2 | 3/2014 | Simonelli et al. |
| 8,672,378 B2 | 3/2014 | Yamasaki et al. |
| 8,747,486 B2 | 6/2014 | Kawasaki et al. |
| 8,794,262 B2 | 8/2014 | Jacobsen et al. |
| 8,821,338 B2 | 9/2014 | Thorson |
| 8,849,457 B2 | 9/2014 | Jacobsen et al. |
| 8,870,967 B2 | 10/2014 | Herr et al. |
| 8,881,616 B2 | 11/2014 | Dize et al. |
| 8,888,864 B2 | 11/2014 | Iverson et al. |
| 8,892,258 B2 | 11/2014 | Jacobsen et al. |
| 8,920,517 B2 | 12/2014 | Smith et al. |
| 8,942,846 B2 | 1/2015 | Jacobsen et al. |
| 8,977,388 B2 | 3/2015 | Jacobsen et al. |
| 8,977,398 B2 | 3/2015 | Jacobsen et al. |
| 9,295,604 B2 | 3/2016 | Zoss et al. |
| 9,314,921 B2 | 4/2016 | Jacobsen et al. |
| 9,329,587 B2 | 5/2016 | Fudaba et al. |

(56) References Cited

U.S. PATENT DOCUMENTS

| | | |
|---|---|---|
| 9,333,097 B2 | 5/2016 | Herr et al. |
| 9,533,411 B2 | 1/2017 | Jacobsen et al. |
| 9,643,323 B2 | 5/2017 | Nagatsuka et al. |
| 9,727,076 B2 | 8/2017 | Smith et al. |
| 9,789,603 B2 | 10/2017 | Jacobsen et al. |
| 1,002,884 A1 | 7/2018 | Cheng et al. |
| 1,021,617 A1 | 2/2019 | Gildert et al. |
| 1,040,667 A1 | 9/2019 | Smith et al. |
| 1,051,258 A1 | 12/2019 | Smith |
| 1,053,354 A1 | 1/2020 | Smith et al. |
| 10,566,914 B2 | 2/2020 | Fujita et al. |
| 2001/0033146 A1 | 10/2001 | Kato et al. |
| 2001/0043847 A1 | 11/2001 | Kramer |
| 2002/0075233 A1 | 6/2002 | White et al. |
| 2002/0094919 A1 | 7/2002 | Rennex et al. |
| 2003/0005896 A1 | 1/2003 | Jacobsen et al. |
| 2003/0146720 A1 | 8/2003 | Riwan et al. |
| 2003/0152452 A1 | 8/2003 | Hodgson |
| 2003/0223844 A1 | 12/2003 | Schiele et al. |
| 2004/0004362 A1 | 1/2004 | Love |
| 2004/0037681 A1 | 2/2004 | Marcotte |
| 2004/0102723 A1 | 5/2004 | Horst |
| 2004/0106881 A1 | 6/2004 | McBean et al. |
| 2004/0116836 A1 | 6/2004 | Kawai et al. |
| 2004/0246769 A1 | 12/2004 | Ido |
| 2004/0250644 A1 | 12/2004 | Gosselin et al. |
| 2005/0059908 A1 | 3/2005 | Bogert |
| 2005/0099386 A1 | 5/2005 | Kukita |
| 2005/0159850 A1 | 7/2005 | Melman |
| 2005/0166413 A1 | 8/2005 | Crampton |
| 2005/0193451 A1 | 9/2005 | Quistgaard et al. |
| 2005/0251110 A1 | 11/2005 | Nixon |
| 2006/0052732 A1 | 3/2006 | Shimada et al. |
| 2006/0064047 A1 | 3/2006 | Shimada et al. |
| 2006/0069449 A1 | 3/2006 | Bisbee, III et al. |
| 2006/0130594 A1 | 6/2006 | Ikeuchi |
| 2006/0149419 A1 | 7/2006 | Ogawa et al. |
| 2006/0184275 A1 | 8/2006 | Hosokawa et al. |
| 2006/0197049 A1 | 9/2006 | Hamada et al. |
| 2006/0245897 A1 | 11/2006 | Hariki et al. |
| 2006/0249315 A1 | 11/2006 | Herr et al. |
| 2007/0054777 A1 | 3/2007 | Kawai et al. |
| 2007/0105070 A1 | 5/2007 | Trawick |
| 2007/0123997 A1 | 5/2007 | Herr et al. |
| 2007/0129653 A1 | 6/2007 | Sugar et al. |
| 2008/0156363 A1 | 7/2008 | Ikeuchi et al. |
| 2008/0269027 A1 | 10/2008 | Chen |
| 2008/0271942 A1 | 11/2008 | Yamashita et al. |
| 2008/0281468 A1 | 11/2008 | Jacobsen et al. |
| 2009/0036815 A1 | 2/2009 | Ido |
| 2009/0038258 A1 | 2/2009 | Pivac et al. |
| 2009/0039579 A1 | 2/2009 | Clifford et al. |
| 2009/0199883 A1 | 8/2009 | Hiki |
| 2009/0210093 A1 | 8/2009 | Jacobsen et al. |
| 2009/0294238 A1 | 12/2009 | Gilmore |
| 2010/0050947 A1 | 3/2010 | Kortekaas |
| 2010/0089855 A1 | 4/2010 | Kjolseth |
| 2010/0094185 A1 | 4/2010 | Amundson et al. |
| 2010/0152630 A1 | 6/2010 | Matsuoka et al. |
| 2010/0198402 A1 | 8/2010 | Greer et al. |
| 2010/0241242 A1 | 9/2010 | Herr et al. |
| 2010/0295497 A1 | 11/2010 | Takamatsu |
| 2011/0010012 A1 | 1/2011 | Murayama et al. |
| 2011/0040216 A1 | 2/2011 | Herr et al. |
| 2011/0046781 A1 | 2/2011 | Summer |
| 2011/0066088 A1 | 3/2011 | Little et al. |
| 2011/0071677 A1 | 3/2011 | Stillman |
| 2011/0219899 A1 | 9/2011 | Dize et al. |
| 2011/0264230 A1 | 10/2011 | Herr et al. |
| 2012/0000891 A1 | 1/2012 | Nakanishi et al. |
| 2012/0060322 A1 | 3/2012 | Simonelli et al. |
| 2012/0065902 A1 | 3/2012 | Nakajima |
| 2012/0073930 A1 | 3/2012 | Lansberry et al. |
| 2012/0137667 A1 | 6/2012 | Jacobsen et al. |
| 2012/0179075 A1 | 7/2012 | Perry et al. |
| 2012/0191245 A1 | 7/2012 | Fudaba et al. |
| 2012/0216671 A1 | 8/2012 | Gammon |
| 2012/0237319 A1 | 9/2012 | Jacobsen et al. |
| 2012/0259429 A1 | 10/2012 | Han et al. |
| 2012/0277901 A1 | 11/2012 | Jacobsen et al. |
| 2012/0277911 A1 | 11/2012 | Jacobsen et al. |
| 2012/0277915 A1 | 11/2012 | Jacobsen et al. |
| 2012/0328395 A1 | 12/2012 | Jacobsen et al. |
| 2013/0011220 A1 | 1/2013 | Jacobsen et al. |
| 2013/0013108 A1 | 1/2013 | Jacobsen et al. |
| 2013/0023803 A1 | 1/2013 | Hsu et al. |
| 2013/0033050 A1 | 2/2013 | Matsuoka et al. |
| 2013/0057001 A1 | 3/2013 | Tsai |
| 2013/0090580 A1 | 4/2013 | Hong et al. |
| 2013/0106127 A1 | 5/2013 | Lipson et al. |
| 2013/0106128 A1 | 5/2013 | Yamasaki et al. |
| 2013/0192406 A1 | 8/2013 | Godowski |
| 2013/0226048 A1 | 8/2013 | Unluhisarcikili et al. |
| 2013/0253385 A1 | 9/2013 | Goffer et al. |
| 2013/0296746 A1 | 11/2013 | Herr et al. |
| 2013/0302129 A1 | 11/2013 | Smith et al. |
| 2013/0331744 A1 | 12/2013 | Kamon |
| 2013/0333368 A1 | 12/2013 | Durfee et al. |
| 2014/0100492 A1 | 4/2014 | Nagasaka |
| 2014/0190289 A1 | 7/2014 | Zhu |
| 2014/0195052 A1 | 7/2014 | Tsusaka et al. |
| 2015/0073595 A1 | 3/2015 | Fudaba et al. |
| 2015/0073596 A1 | 3/2015 | Fudaba et al. |
| 2015/0173929 A1 | 6/2015 | Kazerooni et al. |
| 2015/0209214 A1 | 7/2015 | Herr et al. |
| 2015/0272749 A1 | 10/2015 | Amend, Jr. et al. |
| 2015/0278263 A1 | 10/2015 | Bowles et al. |
| 2015/0321342 A1 | 11/2015 | Smith et al. |
| 2016/0114482 A1 | 4/2016 | Lessing et al. |
| 2016/0153508 A1 | 6/2016 | Battlogg |
| 2016/0331572 A1 | 11/2016 | Popovic et al. |
| 2016/0332302 A1 | 11/2016 | Bingham et al. |
| 2016/0332305 A1 | 11/2016 | Gonzalez et al. |
| 2018/0133905 A1 | 5/2018 | Smith et al. |
| 2018/0193999 A1 | 7/2018 | Jacobsen et al. |
| 2018/0290309 A1 | 10/2018 | Becker et al. |
| 2018/0298976 A1 | 10/2018 | Battlogg |
| 2019/0176320 A1 | 6/2019 | Smith et al. |
| 2019/0184576 A1 | 6/2019 | Smith et al. |

FOREIGN PATENT DOCUMENTS

| | | |
|---|---|---|
| CN | 203495949 U | 3/2014 |
| CN | 203752160 U | 8/2014 |
| CN | 104843484 A | 8/2015 |
| CN | 105818143 A | 8/2016 |
| CN | 107471203 A | 12/2017 |
| CN | 108081303 A | 5/2018 |
| DE | 102004029513 B3 | 9/2005 |
| DE | 102010029088 A1 | 11/2011 |
| DE | 202013009698 U1 | 11/2013 |
| DE | 102016201540 A1 | 8/2017 |
| EP | 0039578 A1 | 11/1981 |
| EP | 0616275 | 9/1998 |
| EP | 0616275 A3 | 9/1998 |
| EP | 1037264 A2 | 9/2000 |
| EP | 1258324 | 11/2002 |
| EP | 1258324 A2 | 11/2002 |
| EP | 1442846 A1 | 8/2004 |
| EP | 1721593 A1 | 11/2006 |
| EP | 2198810 A1 | 6/2010 |
| EP | 2942162 A2 | 11/2015 |
| EP | 2168548 B1 | 10/2016 |
| FR | 2651220 A1 | 3/1991 |
| GB | 686237 A | 1/1953 |
| GB | 2278041 A | 11/1994 |
| JP | S34-015764 | 10/1959 |
| JP | S36-005228 | 5/1961 |
| JP | S44-000603 | 1/1969 |
| JP | S50-009803 | 1/1975 |
| JP | S50-006043 | 3/1975 |
| JP | 52013252 | 2/1977 |
| JP | S52-013252 A | 2/1977 |
| JP | S52-134985 A | 11/1977 |

(56) References Cited

FOREIGN PATENT DOCUMENTS

| | | |
|---|---|---|
| JP | S56-140510 | 11/1981 |
| JP | S56-140510 A | 11/1981 |
| JP | S58-113586 A | 7/1983 |
| JP | S60-177883 U | 11/1985 |
| JP | S62-193784 | 8/1987 |
| JP | S62-193784 A | 8/1987 |
| JP | S62-200600 A | 9/1987 |
| JP | 01-295772 | 11/1989 |
| JP | H01-295772 | 11/1989 |
| JP | H01-295772 A | 11/1989 |
| JP | H02-51083 | 4/1990 |
| JP | H02-51083 U | 4/1990 |
| JP | H03-85398 | 8/1991 |
| JP | H03-85398 U | 8/1991 |
| JP | H04 44296 | 4/1992 |
| JP | H04-44296 U | 4/1992 |
| JP | 5004177 | 1/1993 |
| JP | H05-004177 A | 1/1993 |
| JP | H05-023989 A | 2/1993 |
| JP | H06-213266 A | 8/1994 |
| JP | H07-1366 | 1/1995 |
| JP | H07-001366 A | 1/1995 |
| JP | H07-5129 Y2 | 2/1995 |
| JP | 7060679 | 3/1995 |
| JP | H07-060679 A | 3/1995 |
| JP | H07-112377 | 5/1995 |
| JP | H07-112377 A | 5/1995 |
| JP | H07-31291 | 6/1995 |
| JP | H07-031291 U | 6/1995 |
| JP | H07-246578 | 9/1995 |
| JP | H07-246578 A | 9/1995 |
| JP | H08-126984 A | 5/1996 |
| JP | 9-011176 | 1/1997 |
| JP | H09-11176 A | 1/1997 |
| JP | H1156931 | 3/1999 |
| JP | 11130279 | 5/1999 |
| JP | H11-130279 A | 5/1999 |
| JP | 2002-161547 | 6/2002 |
| JP | 2002-161547 A | 6/2002 |
| JP | 2003-103480 A | 4/2003 |
| JP | 2004/105261 A | 4/2004 |
| JP | 2005-118938 A | 5/2005 |
| JP | 2005-237504 A | 9/2005 |
| JP | 2005-334999 | 12/2005 |
| JP | 2005-334999 A | 12/2005 |
| JP | 2006-016916 | 1/2006 |
| JP | 2006-016916 A | 1/2006 |
| JP | 2006007337 A | 1/2006 |
| JP | 2006-028953 | 2/2006 |
| JP | 2006-028953 A | 2/2006 |
| JP | 2006-051558 A | 2/2006 |
| JP | 2006-167223 A | 6/2006 |
| JP | 3909770 B2 | 4/2007 |
| JP | 2007-130234 A | 5/2007 |
| JP | 2007-252514 A | 10/2007 |
| JP | 2007-307216 A | 11/2007 |
| JP | 2008-143449 | 6/2008 |
| JP | 2008-143449 A | 6/2008 |
| JP | 2009-023828 A | 2/2009 |
| JP | 2009-167673 | 7/2009 |
| JP | 2009-167673 A | 7/2009 |
| JP | 2009-178253 A | 8/2009 |
| JP | 2009-219650 A | 10/2009 |
| JP | 2009-240488 A | 10/2009 |
| JP | 2009-268839 A | 11/2009 |
| JP | 2010-098130 A | 4/2010 |
| JP | 2010-110381 A | 5/2010 |
| JP | 2010-110465 A | 5/2010 |
| JP | 2010-142351 A | 7/2010 |
| JP | 2011-193899 A | 10/2011 |
| JP | 2012-501739 A | 1/2012 |
| JP | 2012-125279 A | 7/2012 |
| JP | 2013-022091 A | 2/2013 |
| JP | 2013-090693 A | 5/2013 |
| JP | 2013-123786 A | 6/2013 |
| JP | 2013-142445 A | 7/2013 |
| JP | 5267730 | 8/2013 |
| JP | 2013-248699 A | 12/2013 |
| JP | 2014-054273 A | 3/2014 |
| JP | 2014-073222 A | 4/2014 |
| JP | 2014200853 A | 10/2014 |
| JP | 2015112649 A | 6/2015 |
| JP | 2015-212010 A | 11/2015 |
| JP | 2016-539017 A | 12/2016 |
| KR | 2007-0057209 A | 6/2007 |
| KR | 2012-0105194 A | 9/2012 |
| KR | 10-1219795 | 1/2013 |
| KR | 2013-0001409 A | 1/2013 |
| KR | 2013-0045777 A | 5/2013 |
| KR | 2018-0128731 A | 12/2018 |
| WO | WO 2003/002309 A1 | 1/2003 |
| WO | WO 2003/081762 A1 | 10/2003 |
| WO | WO 2007/144629 | 12/2007 |
| WO | WO 2007/144629 A2 | 12/2007 |
| WO | WO 2009/143377 | 11/2009 |
| WO | WO 2009/143377 A2 | 11/2009 |
| WO | WO 2010/025409 A1 | 3/2010 |
| WO | WO 2010/027968 A2 | 3/2010 |
| WO | WO 2012/042471 A1 | 4/2012 |
| WO | WO 2017/148499 A1 | 9/2017 |
| WO | WO 2017/159504 A1 | 9/2017 |
| WO | WO 2018/118004 A1 | 6/2018 |
| WO | WO 2018/211869 A1 | 11/2018 |
| WO | WO 2018/215705 A1 | 11/2018 |

OTHER PUBLICATIONS

Barras; "Stabilization of a Biped Robot with its arms—A Practical Approach"; May 1, 2010; http://biorob.epfl.ch/files/content/sites/biorob/filed/users/170220/public/Report.pdf; retrieved on Jul. 10, 2013.

Bauman; Utah Firm Markets on Big Gorilla of an Arm; Deseret News; Jan. 27, 1993; 2 pages.

Giant Robot Grabbing Hands Grab All They Can; Jul. 17, 2007; 3 pages; www.digtalworldtokyo.com/index.php/digital_tokyo/articles/giant_robot_grabbing_hands_grab_all_they_can/

Heavy-Duty Magnetic Base, 300 lb (1334 N) Holding Force, ¼-20Thread; Newport; http://search.newport.com/?q=*&x2=sku&q2=200; as accessed Apr. 23, 2011; 1 page.

Jacobsen et al; Research Robots for Applications in Artificial Intelligence, Teleoperation and Entertainment; The International Journal of Robotics Research; Apr.-May 2004; pp. 319-330; vol. 23, No. 4-5.

Jacobsen; Science, Robotics, and Superheroes; Presented at University of Utah's Science at Breakfast, Mar. 17, 2010; 16 pages.

Kim et al; A Force Reflected Exoskeleton-Type Masterarm for Human-Robot Interaction; IEEE Transactions on Systems, Man and Cybernetics—Part A: Systems and Humans; Mar. 2005, pp. 198-212; vol. 35, No. 2.

Magnetic Base; www.ask.com/wiki/magnetic_base; 2 pages; page last updated Sep. 12, 2012.

Manipulator Dynamics; Amikabir University of Technology; Computer Engineering and Information Technology Department; Power Point; 44 pages.

Song et al; Kinematics Analysis and Implementation of a Motion-Following Task for a Humanoid Slave Robot Controlled by an Exoskeleton Master Robot; International Journal of Control, Automation and Systems; Dec. 2007; pp. 681-690; vol. 5, No. 6.

Tmsuk, Rescue Robot "T-53" release Control Technologies to Control the Synchronous Operation of the Arm; http://robot.watch.impress.co.jp/cda/news/2007/07/18/564.html; as accessed Sep. 1, 2011; 5 pages.

Yeates; Utah-Built Robot Safeguards the Workplace; http://www.ksl.com?nid=148&sid=17654421&autostart=y; Oct. 13, 2011; 3 pages.

PCT/US2012/035511; filed Apr. 27, 2012; Raytheon Company; International Search Report dated Mar. 4, 2013.

PCT/US2012/035553; filed Apr. 27, 2012; Raytheon Company; International Search report dated Oct. 31, 2012.

(56) References Cited

OTHER PUBLICATIONS

PCT/US2012/035570; filed Apr. 27, 2012; Raytheon Company; International Search Report dated Feb. 8, 2013.

Aghili et al., Sensing the torque in a robot's joints, www.memagazine.org/backissues/september98/features/torque/torque.html, The American Society of Mechanical Engineers.

Aliens (Movie), Starring Sigourney Weaver, Directed by James Cameron, Written by James Cameron, David Giler, Walter Hill, Dan O'Bannon, and Ronald Shuset, Released 1985 by Twentienth Century Fox, Scenes at Playtime 88:26:31-00:26:59 & 00:27:40-00:28:05 & 02:08:25-02:10-39, Non Patent Literature documentation; Aliens (1986)—IMDb; downloaded Sep. 27, 2014; 4 pages; http://www.imdb.com/title/tt00905605/.

Amikabir University of Technology, Manipulator Dynamics (Power Point), Computer Engineering and Information Technology Department, to the best of applicant's knowledge article was available before the application filing date, 44 pages.

Barras, Stabilization of a Biped Robot with its arms—A Practical Approach, http://biorob.epfl.ch/files/content/sites/biorob/filed/users/170220/public/Report.pdf; May 2010, 33 pages, EPFL Biorobotics Laboratory (BioRob), Switzerland.

Bauman, Utah Firm Markets on Big Gorilla of an Arm, Deseret News; Jan. 27, 1993, 2 pages, Deseret News Publishing Company, Salt Lake City, Utah.

Claeyssen et al., Magnetostrictive actuators compared to piezoelectric actuators, Proceedings of SPIE—The International Society for Optical Engineering 4763, Mar. 2003, 6 pages.

Digital World Tokyo, Giant Robot Grabbing Hands Grab All They Can, www.digitalworldtokyo.com/index.php/digital_tokyo/articles/giant_robot_grabbing_hands_grab_all_they_can/, Jul. 17, 2007, 3 pages.

Elliot et al., The Biomechanics and Energetics of Human Running using an Elastic Knee Exoskeleton, Jun. 2013, 7 pages, IEEE International Conference on Rehabilitation Robotics, Seattle, Washington.

Elliot et al., Design of a Clutch-Spring Knee Exoskeleton for Running, Journal of Medical Devices, Sep. 2014, 11 pages, vol. 8, The American Society of Mechanical Engineers, New York City, New York.

Endo et al., A quasi-passive model of human leg function in level-ground walking, 2006 IEEE/RSJ International Conference on Intelligent Robots and Systems, Oct. 9-15, 2006, pp. 4935-4939, Institute of Electrical and Electronics Engineers, Piscataway, New Jersey.

Gauthier et al., Magnetic Shape Memory Alloy and Actuator Design, Conference: 5th International Workshop on Microfactories (IWMF'06), Oct. 2006, 5 pages, Besançon, France.

Grabowski et al., Exoskeletons for Running and Hopping Augmentation, Journal of Applied Physiology, http://biomech.media.mit.edu/portfolio_page/load-bearing-exoskeleton-for-augmentation-of-human-running/, 2009, 4 pages, vol. 107, No. 3, American Physiological Society, United States.

Hauser et al., JammJoint: a Variable Stiffness Device Based on Granular Jamming for Wearable Joint Support, IEEE Robotics and Automation Letters, Apr. 2017, 7 pages, vol. 2, Issue 2, Institute of Electrical and Electronics Engineers, Piscataway, New Jersey.

Huber et al., The selection of mechanical actuators based on performance indices, Oct. 8, 1997, pp. 2185-2205, vol. 453 Issue 1965, The Royal Society, London.

Hunter et al., Fast Reversible NiTi Fibers for Use in Microrobotics, Proceedings. IEEE Micro Electro Mechanical Systems, Jan. 30-Feb. 2, 1991, pp. 166-170, Institute of Electrical and Electronics Engineers, Piscataway, New Jersey.

Industrial Magnetics, Inc., PowerLift® Magnets; www.magnetics.com/product.asp?ProductID=1; as accessed Nov. 6, 2012, 2 pages; Boyne City, Michigan.

Jacobsen et al., Research Robots for Application in AI, Teleoperation and Entertainment, Proceedings of the International Fluid Power Exposition and Technical Conference, Mar. 24-24, 1992, pp. 1-19, Chicago, Illinois.

Jacobsen et al., Research Robots for Applications in Artificial Intelligence, Teleoperation and Entertainment; The International Journal of Robotics Research; Apr.-May 2004, pp. 319-330, vol. 23, No. 4-5, Sage Publications, Thousand Oaks, California.

Jacobsen, Science, Robotics, and Superheroes, Presented at Department of Science University of Utah Science at Breakfast, Mar. 17, 2010, 16 pages.

Jafari et al., A Novel Actuator with Adjustable Stiffness (AwAS), Oct. 18-22, 2010, 6 pages, IEEE/RSJ International Conference on Intelligent Robots and Systems, Taiwan.

Jansen et al., Exoskeleton for Soldier Enhancement Systems Feasibility Study, Sep. 2000, 44 pages, Oak Ridge National Laboratory, Oak Ridge, Tennessee.

Kazerooni, Berkeley Lower Extremity Exoskeleton (BLEEX), to the best of applicant's knowledge article was available before the application filing date, 3 pages, University of California, Berkeley, Berkeley, California.

Kim, Development of a small 6-axis force/moment sensor for robot's fingers, Measurement Science and Technology, Sep. 30, 2004, 2 pages, Issue 11, Institute of Physics and IOP Publishing Limited.

Kim et al, A Force Reflected Exoskeleton-Type Masterarm for Human-Robot Interaction, IEEE Transactions on Systems, Man and Cybertentics—Part A: Systems and Humans, Mar. 2005, pp. 198-212, vol. 35, No. 2, Institute of Electrical and Electronics Engineers, Piscataway, New Jersey.

Kulick, An Unpowered Exoskeleton Springs Into Action: Researchers Increase Walking Efficiency, http://www.cmu.edu/me/news/archive/2015/collins-clutch/html, Apr. 1, 2015, 2 pages, Carnegie Mellon, University Mechanical Engineering, Pittsburgh, Pennsylvania.

Laliberte et al., Underactuation in Space Robotic Hands, Proceeding of the 6th International Symposium on Artificial Intelligence and Robotics & Automation in Space, Jun. 18-22, 2001, 8 pages, Canadian Space Agency, Canada.

Magnetic Base, www.ask.com/wiki/magnetic_base; page last updated Sep. 12, 2012, 2 pages, retrieved from www.ask.com/wiki/magnetic_base.

Miao et al., Mechanical Design of Hybrid Leg Exoskeleton to Augment Load-Carrying for Walking, International Journal of Advanced Robotic Systems, Mar. 28, 2013, 11 pages, vol. 10, Intech open science open minds, Europe.

Mirfakhrai et al., Polymer artificial muscles, materialstoday, Apr. 2007, pp. 30-38, vol. 10 No. 4, Elsevier, Netherlands.

Mombaur et al., HEiKA-EXO: Optimization-based development and control of an exoskeleton for medical applications, http://typo.iwr.uni-heidelberg.de/groups/orb/research/heika-exo/, Optimization in Robotics & Biomechanics, Oct. 20, 2014, 3 pages, Germany.

Moosavian et al., Dynamics Modeling and Tip-Over Stability of Suspended Wheeled Mobile Robots with Multiple Arms, 2007 IEEE/RSJ International Conference on Intelligent Robots and Systems, Oct. 29-Nov. 2, 2007; pp. 1210-1215, Institute of Electrical and Electronics Engineers, Piscataway, New Jersey.

Newport Corporation, Heavy-Duty Magnetic Base, 300 lb (1334 N) Holding Force, ¼-20 Thread, http://search.newport.com/?q=*&x2=sku&q2=200, as accessed Apr. 23, 2011, 1 page, Irvine, CA.

Oak Ridge National Laboratory, Foot Force-Torque Sensor Novel Sensor for Measuring Forces and Torques at the Foot, www.ornl.gov, to the best of applicant's knowledge article was available before the application filing date, 1 page, Oak Ridge National Laboratory, Oak Ridge, Tennessee.

Omega, Load Cell Designs, www.omega.com/literature/transactions/volume3/load3.html, Nov. 1, 2005, 3 pages.

Ostling, Wearable Robots, Technology Review, Jul./Aug. 2004, pp. 70-73, Elizabeth Bramson-Boudreau, Cambridge, Massachusetts.

Pan, Improved Design of a Three-degree of Freedom Hip Exoskeleton Based on Biomimetic Parallel Structure, Jul. 2011, 132 pages, University of Ontario Institute of Technology, Canada.

Pelrine et al., Electrostriction of polymer dielectrics with compliant electrodes as a means of actuation, Sensors and Actuators A: Physical, Jan. 1998, pp. 77-85, vol. 64 Issue 1, Elsevier, Netherlands.

(56) References Cited

OTHER PUBLICATIONS

Pelrine et al., High-field deformation of elastomeric dielectrics for actuators, Materials Science and Engineering, Nov. 28, 2000, pp. 89-100, vol. 11 Issue 2, Elsevier, Netherlands.

Pelrine et al., Dielectric Elastomer Artificial Muscle Actuators: Toward Biomimetic Motion, Proceedings of SPIE—The International Society for Optical Engineering, Jul. 2002, pp. 126-137, vol. 4695, SPIE, Bellingham, WA.

Pin, Wearable Robotics Presented to New Horizons in Science Briefing, Oct. 2003, 34 pages, Knoxville, Tennessee.

Pratt et al., The RoboKnee: An Exoskeleton for Enhancing Strength and Endurance During Walking, International Conference on Robotics & Automation, Apr. 2004, 6 pages, IEEE, New Orleans, LA.

Robotics Research Group, Degrees of Freedom, www.robotics.utexas.edu/rrg/learn_more/low_ed/dof/, Oct. 25, 2006, 2 pages, University of Texas.

Rouse et al., Clutchable Series-Elastic Actuator: Design of a Robotic Knee Prosthesis for Minimum Energy Consumption, 2013 IEEE 13th International Conference on Rehabilitation Robotics (ICORR), Jun. 24-26, 2013, 6 pages, Institute of Electrical and Electronics Engineers, Piscataway, New Jersey.

Schuler et al., Dextrous Robot Arm, in Proceedings of the $8^{th}$ESA Workshop on Advanced Space Technologies for Robotic and Automation 'ASTRA 2004' ESTEC, Nov. 2-4, 2004, 8 pages, Noordwijk, The Netherlands.

Searchmap Blog, Scientists Develop Mechanical Spring-Loaded Leg Brace to Improve Walking, http://www.searchmap.eu/blog/scientists-develop-mechanical-spring-loaded-leg-brace-to-improve-walking/, Apr. 1, 2015, 5 pages, Searchmap Blog.

Seppala, These exoskeleton heels could help stroke victims walk again, http://www.engadget.com/2015/04/02/feet-exoskeletons/, Apr. 2, 2015, Engadget, San Francisco, California.

Shamaei et al., Estimation of Quasi-Stiffness of the Human Knee in the Stance Phase of Walking, Mar. 22, 2013, 10 pages, vol. 8 Issue 3. PLOS One, San Francisco, California.

Siddharth et al., Design and Analysis of a 1-DOF Walking Mechanism, http://siddharthaswaminathan.in/files/WalkingMechanism.pdf, Nov. 2012, 7 pages, India.

Smith et al., Integrated thin-film piezoelectric traveling wave ultrasonic motors, Sensors and Actuators A: Physical, Dec. 2012, pp. 305-311, vol. 188, Elsevier, Netherlands.

Song et al, Kinematics Analysis and Implementation of a Motion-Following Task for a Humanoid Slave Robot Controlled by an Exoskeleton Master Robot, International Journal of Control, Automation and Systems, Dec. 2007, pp. 681-690, vol. 5, No. 6, Korean Institute of Electrical Engineers, South Korea.

Suitx, Phoenix Medical Exoskeleton, https://www.suitx.com/phoenix-medical-exoskeleton, 3 pages, to the best of the applicant's knowledge article was available before the application filing date, US Bionics, Inc., Berkeley, California.

Suleiman, Engineering an affordable exoskeleton, Phys.org, https://phys.org/news/2014-06-exoskeleton,html, Jun. 12, 2014, 5 pages, Science X Network.

Tmsuk, Rescue Robot "T-53" release Control Technologies to Control the Synchronous Operation of the Arm, http://robot.watch.impress.co.jp/cda/news/2007/07/18/564.html, as accessed Sep. 1, 2011 5 pages, Robot Watch website.

Ueda et al., Large Effective-Strain Piezoelectric Actuators Using Nested Cellular Architecture With Exponential Strain Amplification Mechanisms, IEEE/ASME Transactions on Mechatronics, Oct. 2010, pp. 770-782, vol. 15 Issue 5, Institute of Electrical and Electronics Engineers, Piscataway, New Jersey.

Vanderborght et al., Variable impedance actuators: A review, Robotics and Autonomous Systems, Dec. 2013, 14 pages, vol. 61, Issue 12, Elsevier, Netherlands.

Walsh, Biomimetic Design of an Under-Actuated Leg Exoskeleton for Load-Carrying Augmentation, Massachusetts Institute of Technology, Feb. 2006, 97 pages, Massachusetts.

Walsh et al., A Quasi-Passive Leg Exoskeleton for Load-Carrying Augmentation, International Journal of Humanoid Robotics, Mar. 8, 2007, 20 pages, vol. 4, No. 3, World Scientific Publishing Company.

Wang et al., A highly-underactuated robotic hand with force and joint angle sensors, 2011 IEEE/RSJ International Conference on Intelligent Robots and Systems, Sep. 25-30, 2011, 6 pages, Institute of Electrical and Electronics Engineers, Piscataway, New Jersey.

Yeates, Utah-built robot safeguards the workplace, http://www.ksl.com?nid=148&sid=17654421&autostart=y; Oct. 13, 2011, 3 pages, KSL Broadcasting, Salt Lake City, Utah.

Yip et al., High-Performance Robotic Muscles from Conductive Nylon Sewing Thread, 2015 IEEE International Conference on Robotics and Automation (ICRA), May 26-30, 2015, 6 pages, Seattle, Washington.

Zubrycki et al., Novel haptic glove-based interface using jamming principle, Proceedings of the $10^{th}$ International Workshop on Robot Motion and Control, Jul. 6-8, 2015, 6 pages, IEEE, Poland.

International Search Report for International Application No. PCT/US2019/068998 dated May 20, 2020, 15 pages.

International Search Report for International Application No. PCT/US2019/069004 dated Apr. 1, 2020, 15 pages.

International Search Report for International Application No. PCT/US2019/069001 dated Apr. 30, 2020, 18 pages.

\* cited by examiner

END EFFECTOR FOR A ROBOTIC ARM

CROSS-REFERENCE TO RELATED APPLICATIONS

This is a divisional application of U.S. application Ser. No. 13/841,006, filed Mar. 15, 2013, entitled "End Effector for a Robotic Arm" which claims the benefit of U.S. Provisional Application Ser. No. 61/646,743, filed May 14, 2012, and entitled, "End Effector for a Robotic Arm," each of which are incorporated by reference in their entirety herein.

GOVERNMENT LICENSE RIGHTS

This invention was made with government support under H94003-04-D-0006 awarded by the Defense Microelectronics Activity (DMEA). The government has certain rights in the invention.

BACKGROUND

Robots can be used to great advantage when automating certain tasks. One area for potential automation is inspecting storage containers. This can reduce the risk to people from potentially hazardous container contents. Most man-handleable storage containers are constructed from stamped sheet metal with latches that have been designed to make them relatively easy for people to open. However, current robotic designs do not exist that make it possible for a robot to be able to easily open such storage containers. Typical two-jaw parallel grippers found on many robots that are equipped with end effectors have not been able to accomplish the container-opening related tasks. As such, in order to be able to facilitate the ability of robotic end effectors to be able to handle, open, inspect and close various containers, either the containers themselves would need to be redesigned to be workable with current end effector designs, or the end effectors themselves would need to be redesigned and configured to achieve such purposes. Redesigning and implementing changes to containers to be workable with current robotic end effector designs would likely result in significant costs.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of technology embodiments is provided below and then specific exemplary technology embodiments are described in further detail later. This is intended to aid readers in understanding the technology more quickly but is not intended to identify key features or essential features of the technology nor is it intended to limit the scope of the claimed subject matter.

Although typical end effectors having parallel two-jaw grippers can be useful for many applications, such end effectors have proven inadequate to accomplish container-opening and closing related tasks (which may include latching and unlatching tasks), which therefore renders automation of storage container opening and inspection impossible or, at least, prohibitively expensive. Accordingly, an end effector for a robotic arm is disclosed that allows manipulation of a latch for a storage container or similar article. The end effector includes a grasping apparatus having a gripping member and an appendage extending from the gripping member forming a channel between the griping member and the appendage. The channel is configured to receive at least a portion of an article, such as a latch for a storage container, to be manipulated by the end effector.

Figure 1:
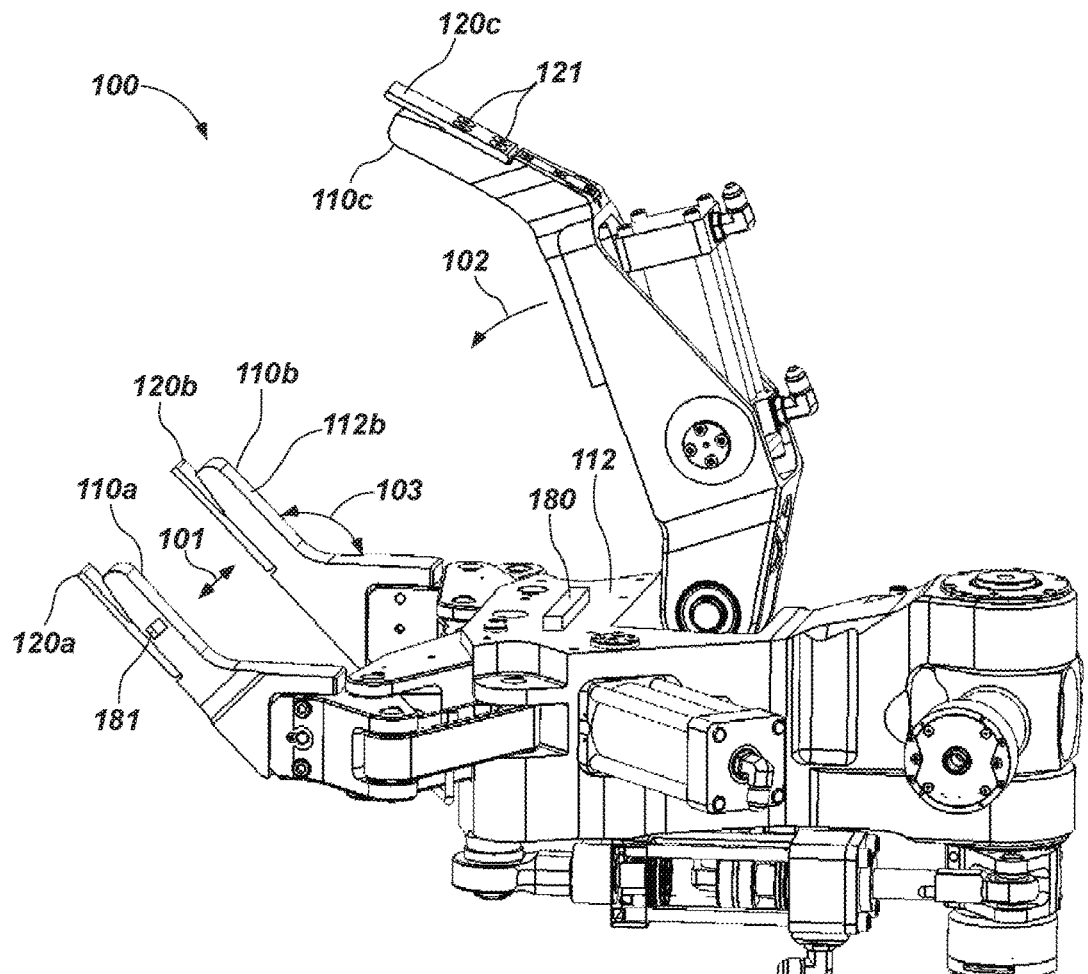
FIG. 1 is an example illustration of an end effector for a robotic arm in accordance with an embodiment of the present invention.

One embodiment of an end effector 100 for a robotic arm is illustrated in FIG. 1. The end effector 100 can comprise a grasping apparatus having one or more gripping members, such as first and second finger-type gripping members 110*a*, 110*b* and a third opposable thumb-type gripping member 110*c*. One such robotic grasping apparatus is disclosed in U.S. Pat. No. 5,588,688, which is incorporated by reference herein in its entirety. The finger-type gripping members fingers 110*a*, 110*b* of the grasping apparatus can be configured to move in direction 101 relative to one another. The thumb-type gripping member 110c can be configured to move in direction 102 to grasp an object. The finger-type and/or thumb-type gripping members can be oriented at an angle 103 to enhance grasping capabilities. In one aspect, the finger-type and/or thumb-type gripping members can be configured such that the angle 103 is adjustable, such as by a rotatable joint.

The end effector 100 can also include one or more appendages, such as appendages 120a, 120b, 120c, extending from one or more of the gripping members. As described in more detail hereinafter, the appendage operate with the gripping member to form a channel or void between the griping member and the appendage, such that the channel comprises walls that interface with an article to be manipulated by the end effector. The channel can be configured to receive at least a portion of an article to be manipulated by the end effector, such as a latch of a storage container. In many containers comprising latches, the latch is typically accessible from one side. The appendage can be positioned on a side or about a surface of the gripping member (e.g., finger and/or thumb-type gripping members) opposite a grasping surface (e.g., see grasping surface 112b of gripping member 110b), similar to a fingernail of a human. Thus, the gripping members of the grasping apparatus can maintain full functionality for grasping objects and, by incorporating an appendage, can also be utilized to manipulate objects that otherwise would have been beyond the capabilities of the end effector. This placement can also provide access to a container latch and, once engaged with the latch, leverage to assist in successfully opening and/or closing the latch. The formation of the channel by the appendage and the gripping member can therefore effectively capture the stamped plate latches present on many storage containers.

In one aspect, an appendage can be an integral or permanent component with a gripping member. In another aspect, as shown in the figure, an appendage can be removably attachable to a gripping member. For example, appendage 120c can be removably coupled to the thumb 110c with fasteners 121. This can provide for interchangeability of the appendage, such as to repair or replace an appendage, to install an appendage of a different configuration, to modify a dimension of the appendage or the formed channel or other attribute or feature, etc. as described herein.

The appendage can comprise a plurality of configurations. For example, in one exemplary embodiment, an appendage can comprise a long, thin structure, and can be made of any suitable material, such as metal, metal alloys, composite materials, plastics, etc. A variety of configurations are contemplated, provided these operate with the gripping member in a suitable manner to provide the functionality discussed herein. Moreover, an appendage can be coupled or associated with any one or more of the gripping members, and a gripping member need not have an appendage.

Figure 2A:
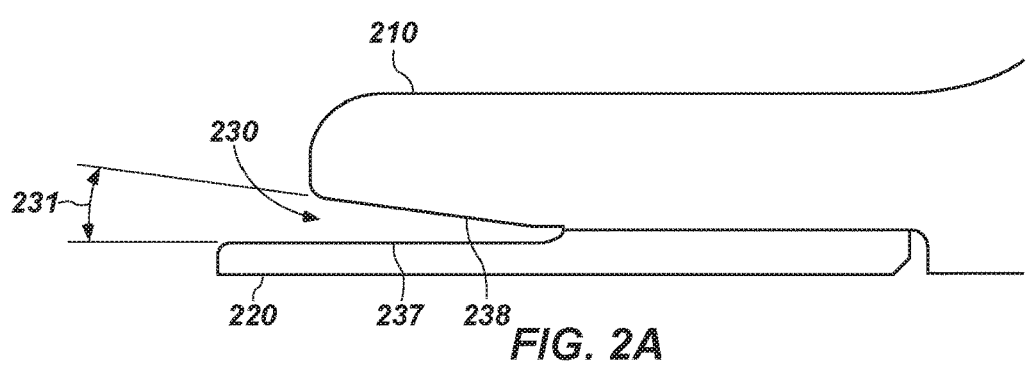
FIG. 2A is an example illustration of a gripping member and an appendage in accordance with an embodiment of the present invention.
Figure 2B:
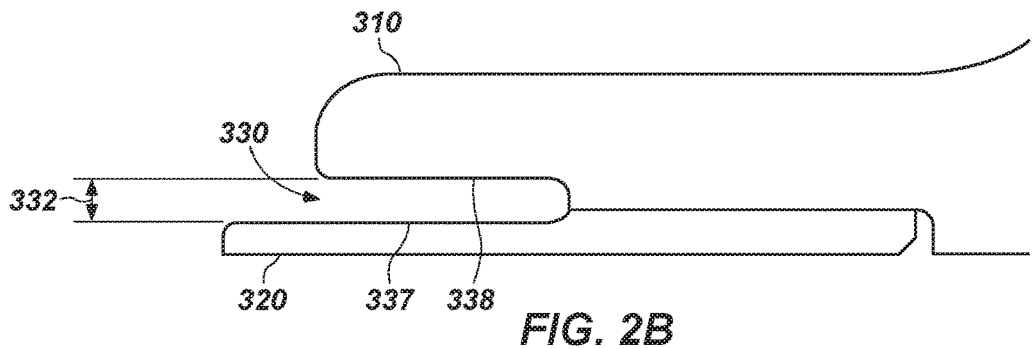
FIG. 2B is an example illustration of a gripping member and an appendage in accordance with another embodiment of the present invention.

FIGS. 2A and 2B illustrate different embodiments of channels that can be formed by an appendage and a gripping member. For example, as shown in FIG. 2A, a tapered channel 230 can have walls 237, 238 tapered at an angle 231 to facilitate capturing a latch and to wedge the latch positively into the space provided. Once captured, the end effector has excellent leverage to move the latch to open and/or close the latch. On the other hand, as shown in FIG. 2B, a gap 332 of a channel 330 formed by parallel walls 337, 338 can be uniform along a length of the channel. In any configuration, the channel can be formed and configured to facilitate capture and operation of the latch, a family of similar latches, or a variety of different types of latches.

Figure 3A:
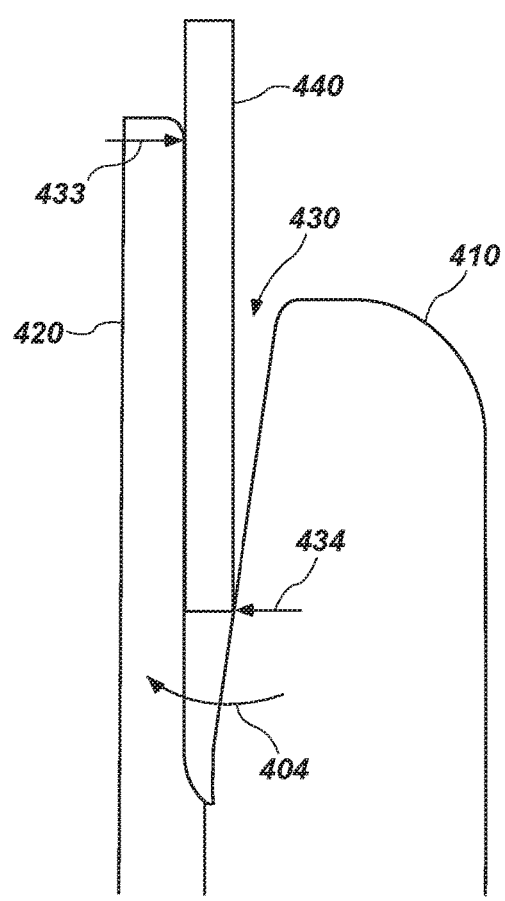
FIGS. 3A and 3B are example illustrations of a channel receiving at least a portion of an article to be manipulated by the end effector, in accordance with an embodiment of the present invention.
Figure 3B:
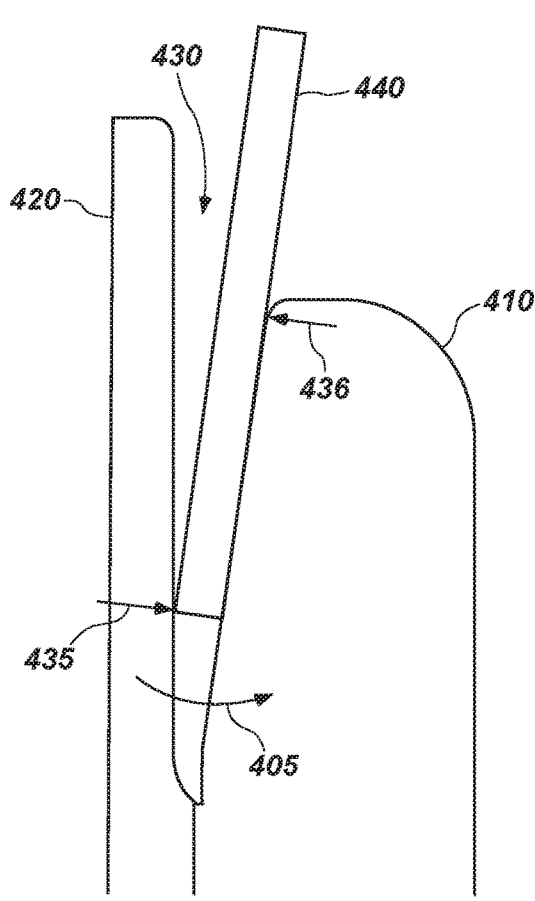

FIGS. 3A and 3B illustrate an article 440, such as a container latch, in a channel 430 formed by an appendage 420 and a gripping member 410 of an end effector. In FIG. 3A, the end effector causes rotation of the appendage and gripping member in direction 404 such that the gripping member impinges on the article 440 exerting force 434 on the article and appendage 420 impinges on the article exerting force 433 on the article. The forces 433, 434 tend to bind the article in the channel and allow the captured article to be manipulated by the end effector. FIG. 38 illustrates rotation of the end effector in an opposite direction 405. Here, the end effector causes rotation of the appendage and gripping member such that the gripping member impinges on the article 440 exerting force 436 on the article and appendage 420 impinges on the article exerting force 435 on the article.

With reference to FIG. 30, illustrated is another embodiment of a grasping apparatus as part of an end effector, wherein the grasping apparatus is configured to manipulate an article 540 in a channel 530 formed by an appendage 520 and a gripping member 510 of the grasping apparatus of an end effector. In this case, the article 540 is not engaged in the channel to the maximum extent possible. However, as shown in the figure, successful manipulation of the article is still possible. As the end effector is rotated in direction 504, the gripping member and the appendage both impinge on the article sufficient to allow the article to be manipulated by the end effector. This figure illustrates that some of the exemplary appendages and gripping members are contemplated herein as having a suitable configuration (e.g., length dimension) in order to provide a channel with sufficient size, configuration, dimensions to receive an article at various locations within the channel, while still being able to effectively manipulate the article.

Additionally, the appendage and/or gripping member, and the channel formed or defined by these, can include one or more friction enhancing features 522, 512 to improve grip on the article when the article is disposed in the channel. Friction enhancing features can include surface treatments, geometrical features, materials, attachments, etc. configured to enhance friction between the grasping apparatus and the article.

Figure 3C:
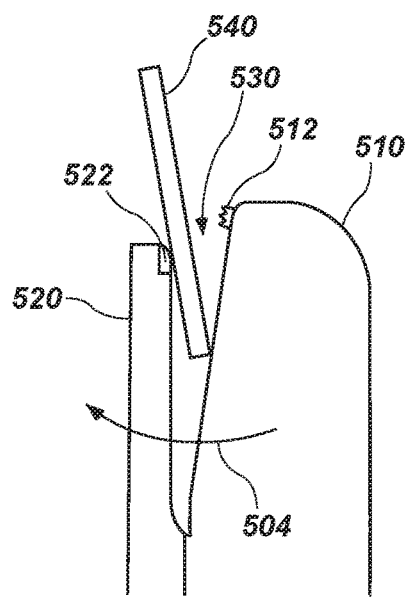
FIG. 3C is an example illustration of a channel receiving at least a portion of an article to be manipulated by the end effector, in accordance with another embodiment of the present invention.

In one aspect of the present disclosure, an appendage can be any suitable length to allow manipulation of the article. For example, as shown in FIGS. 3A and 3B, the appendage 420 can extend a distance beyond the gripping member 410, or beyond the end of the gripping member (again, similar to a fingernail). On the other hand, and in other embodiments, the appendage may not extend beyond the end of the gripping member. For example, the exemplary appendage illustrated in FIG. 3C does not extend beyond the gripping member. Depending on the specific situation, either configuration may prove to be more beneficial in engaging an article.

Figure 4:
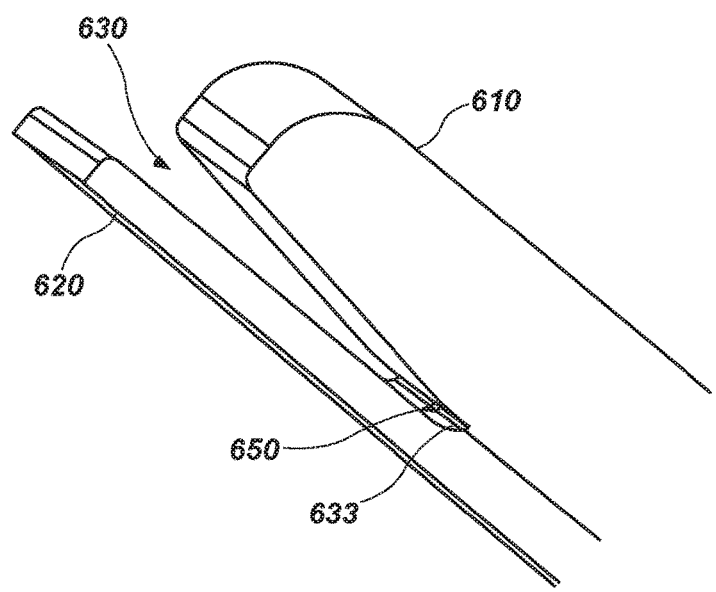
FIG. 4 is an example illustration of a sensor associated with an appendage in accordance with an embodiment of the present invention.

Referring to FIG. 4, a channel 630 is illustrated with a sensor or light 650 disposed therein. In particular, the channel 630 is formed or defined by an appendage 620 and a gripping member 610. The sensor or light 650 associated with the appendage can be located at a base or bottom 633 of the channel 630, as shown, or can be located at other suitable locations about the appendage 620 and/or gripping member 610, or can be present in plurality, if desired. The sensor and/or light 650 can provide various functions, such as to assist positioning of the channel when receiving the article to be manipulated. In other words, the sensor or light can facilitate alignment and engagement of the channel 630 with an article. Any suitable type of sensor is contemplated for use in accordance with the present disclosure. For example, and not to be limiting in any way, a proximity sensor, a laser rangefinder, radar, LIDAR, a positional sensor, a sonar array, a camera, a microphone, or any other type of sensing instruments, alone or in combination, may be used. Additionally, any type of light may be used, including LEDs, those of different emission spectra, including LASERs, and others. Of course, these are not intended to be limiting in any way as other types of sensors, lights, and equipment may be utilized as known in the art.

The sensor or light 650 can be recessed or disposed in countersunk holes at the bottom of the channel. Recessing the sensor or light can provide protection for the sensor or light from the article in the channel.

In some embodiments, both a light and a sensor can be used together. For example, a light can be used to illuminate the article and a camera can be used to provide a visual of the article. Such a camera can be optimized for the spectra emitted by the light. Information received from the sensor can be used to align and engage the channel with the article. In another example, a LIDAR scanner can enable the end effector to carry out 3-D scans of objects and surroundings to facilitate object recognition and positioning of a given object within a workspace.

Sensor information can be communicated to the operator and/or the robotic device. For example, in one aspect, an operator can use the sensor information to manually guide and maneuver the end effector into engagement with the article. In another aspect, the sensor information can be communicated and processed by the robot in a manner so as to facilitate autonomous maneuver of the end effector into engagement with the article.

In some embodiments of the present disclosure, a sensor and/or light can be associated with or disposed on other components or elements of an end effector. For example, as shown in FIG. 1, a sensor or light 180, 181 can be disposed on a gripping member (finger 110a) and/or a palm 112 of the grasping apparatus. Thus, a finger, thumb, and/or palm of the grasping apparatus can be equipped with camera and illumination assets to further increase the situational awareness provided by the end effector in the workspace. In some embodiments, a finger, thumb, and/or palm of the grasping apparatus can be equipped with assets or equipment, such as barcode or other code readers, and/or RFID tag readers, any of which can be used to interrogate and properly identify the container and associated contents of record. Additionally, other sensors can be associated with a finger, thumb, and/or palm of the grasping apparatus to permit other types of interrogation, such as NDI assets, acoustic detectors, gas detectors, substance-of-interest detectors, vibration sensors, tactile sensors, spectrometers, biohazard detectors, object recognition capabilities, etc.

It is further contemplated that such sensors and equipment can be disposed at any suitable location on the end effector, not just on the grasping apparatus. In the case of an optical reader, for example, the optical reader can be located at any suitable location, such as to provide an unobstructed view of an object to be scanned. The end effector can include any suitable attachment point or feature or interface, such as a pocket, platform, or counter bore, to accommodate and support a sensor, asset, and/or other equipment disposed on the end effector. Those skilled in the art will recognize the many different types of sensors that can be utilized, as well as the several locations that these can be placed about the end effector. Sensors, assets, and/or other equipment can therefore be utilized to open/close a container and/or to inspect the contents of a container once opened.

In a particular aspect of the present disclosure, applicable to facilitating use of the end effector by a human operator in real-time and/or enabling automation of the end effector (such as a container access and inspection process), the sensors, assets, and/or equipment described above can be used to augment situational awareness. For example, a LIDAR or other 3-D scanning system can be used to create 3-D imaging of the workspace and a container within the workspace to provide environment and container-related information to better enable the gripper to correctly mate with the proper portion of the container.

Figure 5A:
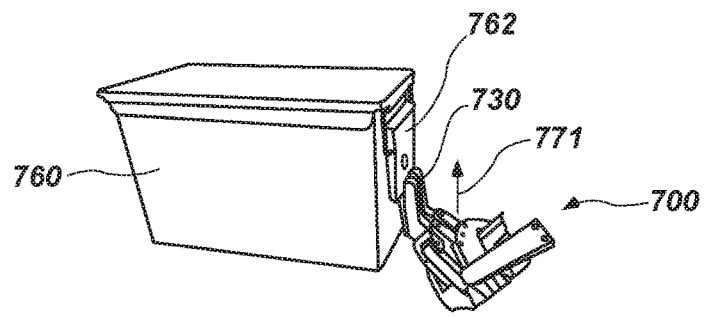
FIGS. 5A-5D are example illustrations of an end effector for a robotic arm manipulating a latch of a storage container in accordance with an embodiment of the present invention.
Figure 5B:
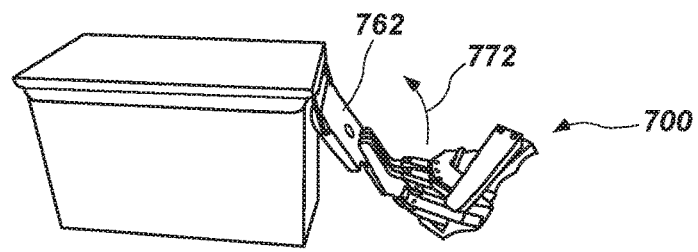
Figure 5C:
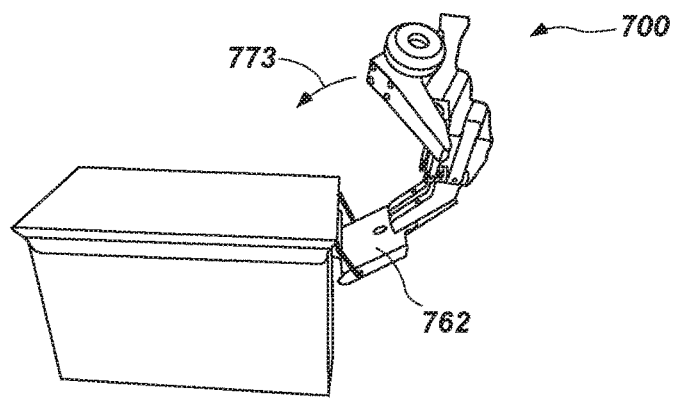
Figure 5D:
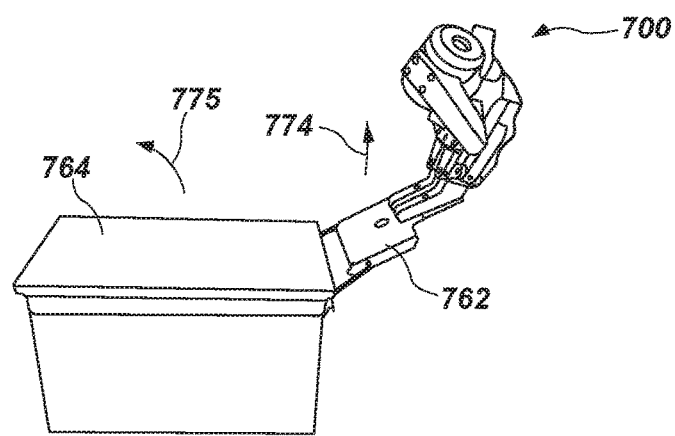

FIGS. 5A-5D illustrate an end effector 700 in use in manipulating a latch 762 of a storage container 760 to unlatch and open the storage container 760. In particular, the end effector 700 can engage the latch 762 by moving in direction 771, such that the appendage is positioned under at least a portion of the latch 762 (with the gripping member positioned over the latch 762), such that a portion of the latch 762 is caused to be at least partially received within the channel 730, as shown in FIG. 5A. Once engaged, the end effector 700 can be caused to move in direction 772 to initiate release of the latch 762, as shown in FIG. 5B, with the portion of the latch 762 being retained in the channel. The end effector 700 can continue movement in direction 773 to complete release and disengagement of the latch 762, as shown in FIG. 5C. Once the latch 762 has been disengaged, the end effector 700 can move in direction 774 and/or 775 to move a cover 764 of the container 760 to open the container 760, as shown in FIG. 5D. It should be recognized that the above-described operation for opening the container 760 can be reversed in order to close the container 760, and latch the latch 762. Thus, as illustrated herein, a single gripping member, or multiple gripping members arranged in parallel, can be used to grab the latch from one side, even if the latch is close to a flat surface, and subsequently the end effector can be operated to manipulate the latch in a manner analogous to the way that the latch would be manipulated by a human.

In addition to the storage container type illustrated in FIGS. 5A-5D, it is contemplated that an end effector in accordance with the present disclosure can be configured to open and/or close a wide variety of container types. For example, the end effector can be configured to open, close, and/or inspect a wide range of ammunition-style and gas can-style storage containers, as well as a paint container, a five gallon container, a 55 gallon drum container, or any other type of container that can be opened and/or closed utilizing an appendage and a channel formed by the appendage. In some cases, such containers have a lid with a lip around a top rim of the container that can be engaged by the appendage. Such containers can hold a wide variety of contents, such as paint, ice melting salt, pickles, chemicals, etc., which can be inspected with appropriate sensors or other equipment disposed on the end effector, as discussed herein. Modifications to the end effector, or end effectors of a somewhat different configuration which are best suited to open a given type of container are contemplated.

Figure 6A:
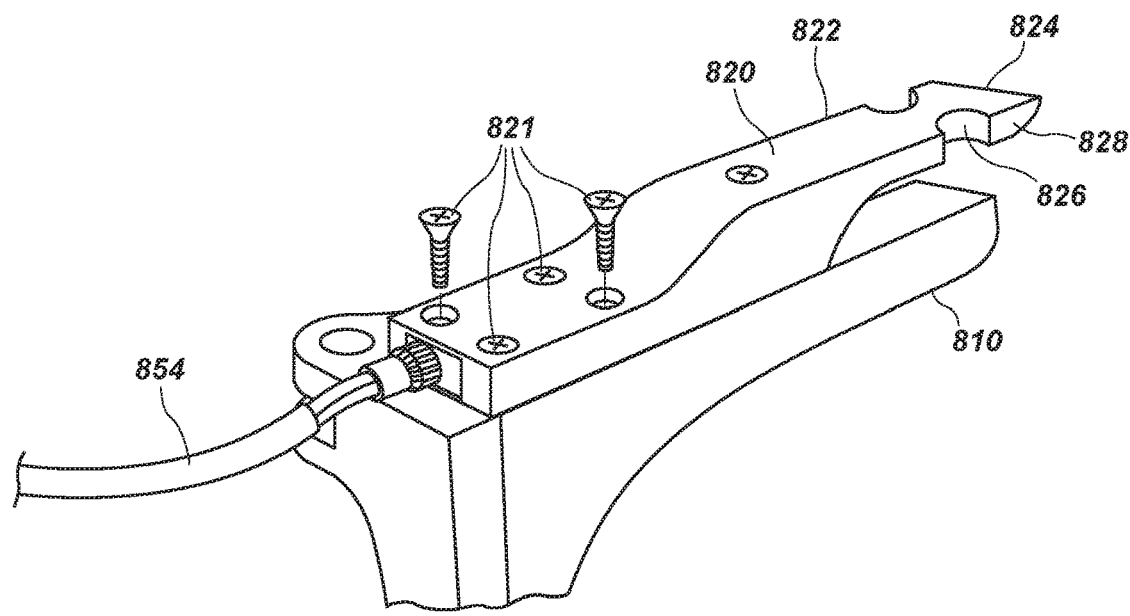
FIGS. 6A-6C are example illustrations of a retrofit appendage in accordance with an embodiment of the present invention.
Figure 6B:
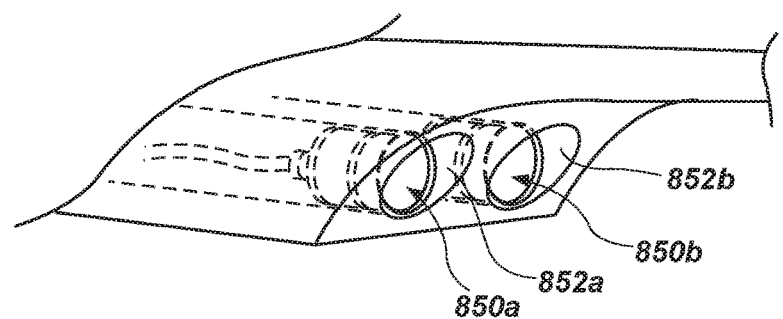
Figure 6C:
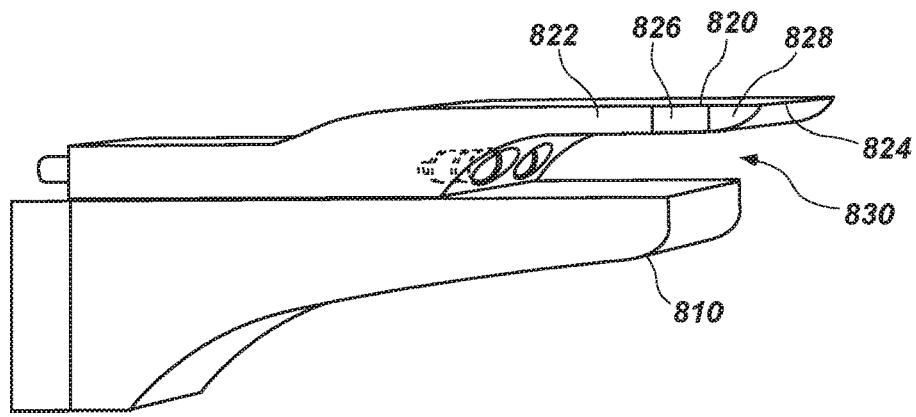

With reference to FIGS. 6A-6C, an appendage 820 is illustrated as a retrofit for an existing gripping member 810. The retrofit appendage 820 can be secured to the gripping member 810 with one or more fasteners 821 to form a channel 830. The retrofit appendage 820 can also include one or more sensors or lights 850a, 850b disposed in counter bores 852a, 852b, respectively, as described hereinabove. A cable 854 can be used to transmit power and/or data to/from the sensors or lights. Thus, an appendage can be a standalone device that can be added to any existing grasping apparatus/manipulator system to allow the modified grasping apparatus/manipulator system to open and/or close containers.

FIGS. 6A and 6C further illustrate, and the appendage 820 can further comprise, one or more indentations or cut-aways or cut-outs formed along the side or sides 822 of the appendage 820. The one or more cut-outs can comprise any configuration, or can be located anywhere along the appendage 820. In the exemplary embodiment shown, two cut-outs (see for example cut-out 826 and similar cut-out 827) having a semi-circular cross-section are shown formed in the appendage 820 along opposing sides 822 and 823, respectively, of the appendage 820. The cut-out 826 is shown as being positioned near the distal end 824 (unattached or free end) of the appendage 820, and is further shown as being positioned a separation distance away from the end 824, thus providing and defining a lateral edge 828 that intersects with the end 824 and the cut-out 826. Cut-out 827 is similarly positioned and configured relative to the appendage 820. The cut-outs 826 and 827 function to further assist in the opening of various containers or container types. Indeed, the cut-outs 826 and 827 can function to receive and contact a portion of a container to be opened. By providing additional surface area oriented in directions different from the sides 822, 823 and end 824 of the appendage 820, the cut-outs 826 and 827 facilitate the application of forces to and/or against objects to be manipulated (e.g., a container to be opened) that might not otherwise have been available with an appendage devoid of such cut-outs. With the presence of one or more cut-outs, the end effector is provided with additional manipulation capabilities.

As will be recognized by those skilled in the art, the cut-outs 826 and 827 formed in the appendage 820 are not intended to be limiting in any way. Indeed, those skilled in the art will recognize that the appendage can comprise any number of indentations or cut-outs, and that these can comprise any desirable or needed configuration. In addition, those skilled in the art will recognize that one or more cut-outs, similar to those shown in FIGS. 6A and 6C, can be formed in any of the exemplary appendages of any of the exemplary end effectors discussed herein. In other words, those skilled in the art will recognize that any of the exemplary end effectors, with their associated appendage(s), as discussed herein, can comprise one or more indentations or cut-outs similar to those described above and shown in FIGS. 6A and 6C.

Figure 7A:
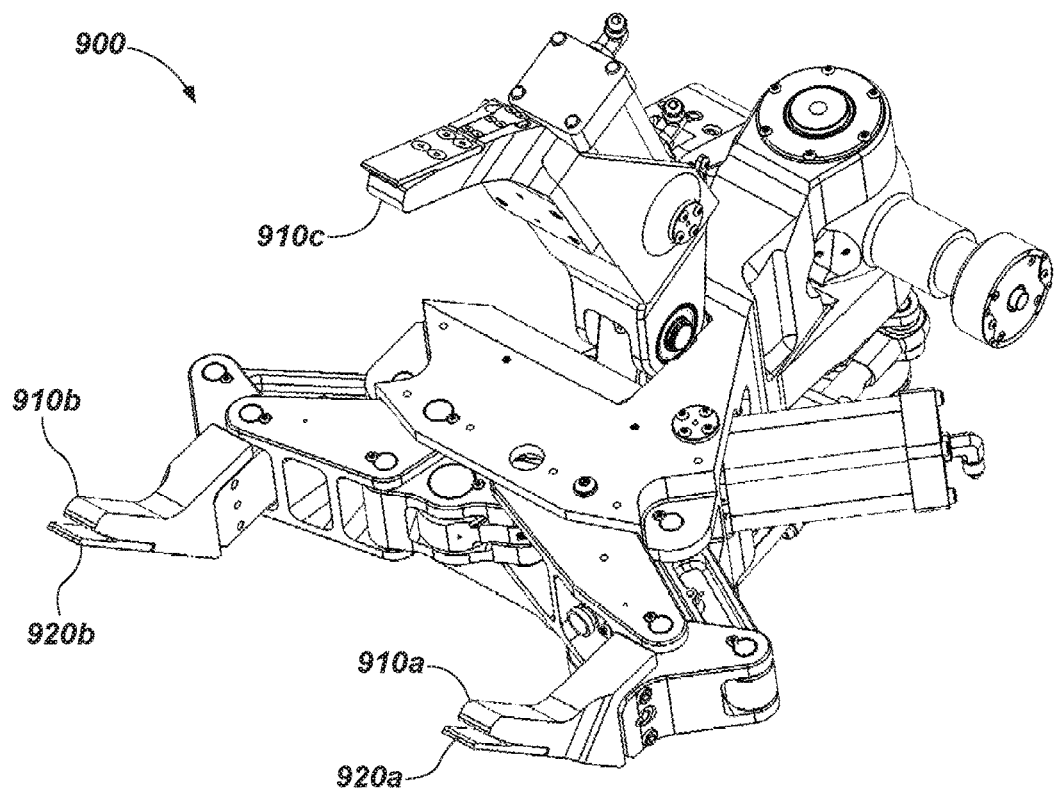
FIGS. 7A and 7B are example illustrations of a gripping member of an end effector that is rotatable to a position that minimizes interference during use of an appendage, in accordance with an embodiment of the present invention.
Figure 7B:
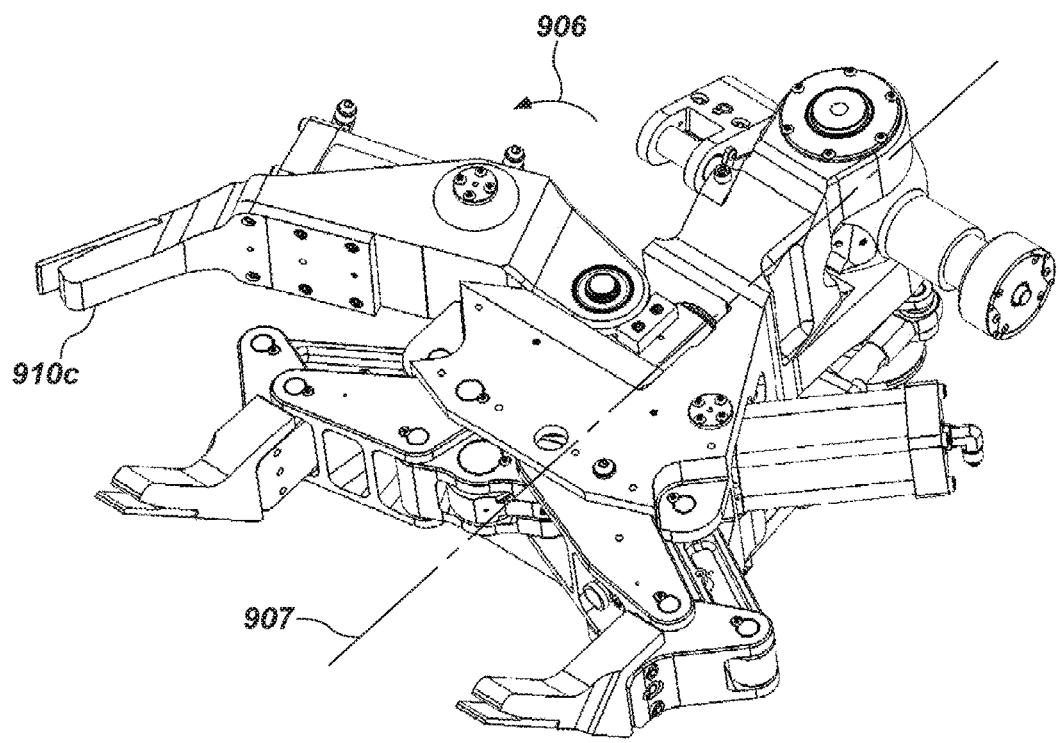

FIGS. 7A and 7B illustrate a grasping apparatus of an end effector 900 with an appendage in the form of a thumb 910c that is movable to minimize interference during use of one or more other appendages 920a, 920b. For example, the end effector 900 permits rotation of the thumb 910c in direction 906 about axis 907. Such movement can bring the thumb 910c out of the position opposite the two-jaw gripper (having appendages in the form of fingers 910a, 910b) to a position beside the two-jaw gripper. This can provide space for the appendages 920a, 920b to be used alone and without mechanical interference with the thumb 910c when manipulating an article, such as opening a container. When operations utilizing the appendages are complete, the thumb 910c can be rotated back into position opposite the two-jaw gripper for full grasping functionality of the end effector with the fingers 910a, 910b and the thumb 910c.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for manipulating an article, the method comprising:
    positioning an end effector in close proximity to an article to be manipulated, the end effector comprising a grasping apparatus having a gripping member and a first wall, and an appendage extending from the gripping member and having a second wall opposing the first wall, the first and second walls forming an elongated channel between the griping member and the appendage;
    manipulating the end effector such that at least a portion of the article is caused to be received within the elongated channel, and caused to be captured between the first and second walls to grip the portion of the article received within the elongated channel solely by the first and second walls; and
    manipulating the end effector to manipulate the portion of the article gripped solely by the first and second walls.

2. The method of claim 1, further comprising manipulating the end effector such that at least a portion of the article is caused to be received within a cut-out formed in the appendage.

3. The method of claim 1, further comprising actuating at least one of a sensor and a light source to assist in manipulating the article.

4. The method of claim 1, further comprising operating at least one additional gripping member.

5. The method of claim 1, further comprising rotating the at least one additional gripping member to a position that minimizes interference during use of the appendage.

6. The method of claim 1, further comprising configuring the at least one additional gripping member with an appendage.

* * * * *